(12) United States Patent  
Spampinato et al.

(10) Patent No.: US 9,319,586 B2  
(45) Date of Patent: Apr. 19, 2016

(54) METHOD AND DEVICE FOR STABILIZING VIDEO SEQUENCES, RELATED VIDEO-CAPTURE APPARATUS AND COMPUTER-PROGRAM PRODUCT

(71) Applicant: STMicroelectronics S.r.l., Agrate Brianza (IT)

(72) Inventors: Giuseppe Spampinato, Catania (IT); Arcangelo Ranieri Bruna, Giardini Naxos (IT)

(73) Assignee: STMicroelectronics S.R.L., Agrate Brianza (IT)

( * ) Notice: Subject to any disclaimer, the term of this patent is extended or adjusted under 35 U.S.C. 154(b) by 70 days.

(21) Appl. No.: 14/163,090

(22) Filed: Jan. 24, 2014

(65) Prior Publication Data

US 2014/0204227 A1    Jul. 24, 2014

(30) Foreign Application Priority Data

Jan. 24, 2013    (IT) ................ TO2013A0059

(51) Int. Cl.
     *H04N 5/232*      (2006.01)
     *G06T 7/20*      (2006.01)

(52) U.S. Cl.
     CPC .......... *H04N 5/23254* (2013.01); *G06T 7/2033* (2013.01); *H04N 5/23261* (2013.01); *H04N 5/23267* (2013.01); *H04N 5/23277* (2013.01)

(58) Field of Classification Search
     CPC ................ H04N 5/144; H04N 5/145; H04N 5/23248–5/2329; G06T 7/0024–7/0038; G06T 7/0071; G06T 7/20–7/2093; G06T 2207/10016; G06T 2207/30241; G06T 2207/30244

USPC ........ 348/208.1, 208.3, 208.4, 208.6, 208.99; 382/294

See application file for complete search history.

(56) References Cited

U.S. PATENT DOCUMENTS

| | | | |
|---|---|---|---|
| 2008/0225127 A1* | 9/2008 | Ming ....................... | 348/208.99 |
| 2009/0194864 A1* | 8/2009 | Dang et al. .................. | 257/691 |
| 2010/0118156 A1* | 5/2010 | Saito ......................... | 348/208.6 |
| 2010/0157070 A1* | 6/2010 | Mohanty et al. ........... | 348/208.1 |
| 2010/0253793 A1* | 10/2010 | Auberger et al. .......... | 348/208.4 |

(Continued)

FOREIGN PATENT DOCUMENTS

WO      2007020569      2/2007

OTHER PUBLICATIONS

Search Report for Italian patent application serial No. TO20130059; Munich, Germany, Oct. 11, 2013, 2 pages.

(Continued)

*Primary Examiner* — Lin Ye  
*Assistant Examiner* — Chriss Yoder, III  
(74) *Attorney, Agent, or Firm* — Seed IP Law Group PLLC

(57) ABSTRACT

According to an embodiment, a sequence of video frames as produced in a video-capture apparatus such as a video camera is stabilized against hand shaking or vibration by:—subjecting a pair of frames in the sequence to feature extraction and matching to produce a set of matched features;—subjecting the set of matched features to an outlier removal step; and—generating stabilized frames via motion-model estimation based on features resulting from outlier removal. Motion-model estimation is performed based on matched features having passed a zone-of-interest test confirmative that the matched features passing the test are distributed over a plurality of zones across the frames.

15 Claims, 2 Drawing Sheets

(56) References Cited

U.S. PATENT DOCUMENTS

| | | | |
|---|---|---|---|
| 2012/0069203 A1 | 3/2012 | Voss et al. | |
| 2012/0112347 A1* | 5/2012 | Eckhardt et al. | 257/751 |
| 2013/0083192 A1* | 4/2013 | Strine et al. | 348/143 |

OTHER PUBLICATIONS

F. Vella, A. Castorina, M. Mancuso, G. Messina, "Digital Image Stabilization by Adaptive Block Motion Vectors Filtering", IEEE Transactions on Consumer Electronics, vol. 48, No. 3, Aug. 2002; IEEE Journals & Magazines; pp. 796-801.

A. Engelsberg, G. Schmidt, "A comparative review of digital image stabilising algorithms for mobile video communications", IEEE Transactions on Consumer Electronics, vol. 45, No. 3, Aug. 1999; IEEE Journals & Magazines; pp. 591-597.

Yong Chul Park and Joon Ki Paik, "An adaptive motion decision system for digital image stabilizer based on edge pattern matching", IEEE 1992 International Conference on Consumer Electronics, ICCE Digest of Technical Papers, IEEE Conference Publication, Jun. 1992; pp. 318-319.

M. Kim, E. Kim, D. Shim, S. Jang, G. Kim, and W. Kim, "An Efficient Global Motion Characterization Method for Image Processing Applications", IEEE Transactions on Consumer Electronics, vol. 43, Issue 4; IEEE Journals & Magazines; Nov. 1997; pp. 1010-1018.

D. G. Lowe, "Distinctive image features from scale-invariant keypoints", International Journal of Computer Vision, 60, 2 (2004), 2004 Kluwer Academic Publishers. Manufactured in The Netherlands; pp. 91-110.

K. Mikolajczyk and C. Schmid, "A performance evaluation of local descriptor", IEEE Transactions on Pattern Analysis and Machine Intelligence, Oct. 2005, vol. 27, Issue 10; IEEE Journals & Magazines; pp. 1615-1630.

H. Bay, A. Ess, T. Tuytelaars, L. Van Gool, "SURF: Speeded Up Robust Features", Computer Vision and Image Understanding, vol. 110, No. 3, pp. 346-359, 2008.

B. Pinto, and P.R. Anurenjan, "Video stabilization using Speeded Up Robust Features", International Conference on Communications and Signal Processing, 2011; IEEE Conference Publications; pp. 527-531.

B. Lucas, T. Kanade, "An Iterative Image Registration Technique with an Application to Stereo Vision", Proceedings DARPA Imaging Understanding Workshop, Apr. 1981; pp. 121-130.

J. Shi, C. Tomasi, "Good Features to Track", IEEE Conference on Computer Vision and Pattern Recognition, Jun. 1994; IEEE Conference Publications; pp. 593-600.

M. A. Fischler, R. C. Bolles, "Random sample consensus: a paradigm for model fitting with applications to image analysis and automated cartography," Communications of the ACM, New York, NY; vol. 24, No. 6, Jun. 1981, pp. 381-395.

Teng Fei, Liang Xiao-hui, He Zhi-ying, Hua Guo-liang, "A Registration Method Based on Nature Feature with KLT Tracking Algorithm for Wearable Computers", 2008 International Conference on Cyberworlds, 2008, IEEE Conference Publications; pp. 416-421.

"Test Model 3: Compact Descriptors for Visual Search," International Organisation for Standardisation ISO/IEC JTC1/SC29/WG11/W12929, Jul. 2012, 32 pages, Stockholm, SE.

* cited by examiner

METHOD AND DEVICE FOR STABILIZING VIDEO SEQUENCES, RELATED VIDEO-CAPTURE APPARATUS AND COMPUTER-PROGRAM PRODUCT

PRIORITY CLAIM

The instant application claims priority to Italian Patent Application No. TO2013A000059, filed 24 Jan. 2013, which application is incorporated herein by reference in its entirety.

TECHNICAL FIELD

An embodiment disclosed in this description relates to processing video sequences, i.e., sequences of digital video images or frames.

Various embodiments may relate to techniques for stabilizing video sequences, optionally by using feature-based algorithms.

In this description, reference will be made to a number of documents each identified by a reference numeral between square brackets (i.e. [X]). A list of these documents and the reference numerals associate therewith is provided at the end of this description. All of these documents are incorporated by reference herein.

SUMMARY

Video stabilization is a technique for compensating user hand shaking, to avoid grabbing, in a video sequence, non-intended motion, which may cause a video sequences to be unpleasant for the final user to view. Different image-stabilization techniques (feature-based, block matching-based, optical flow-based, and so on, see, e.g., documents [1][2][3] [4]) have been developed in the past which are adapted to achieve good performance.

In recent years, techniques based on local invariant descriptor fields have made remarkable progress. For instance, so-called SIFT features, as described in [5], show excellent performance for affine transformations, scale changes, rotation, and so on as demonstrated, e.g., in [6], while being likely to be too expensive in terms of computational load. So-called SURF features, as described in [7], have been introduced in order to reduce the computational burden and achieve similar results, as demonstrated, e.g., in [8]. In various applications, these techniques may also turn out to be computationally expensive, and thus not properly suited for real-time applications.

Various embodiments overcome the drawbacks of such conventional solutions.

Various embodiments may relate to a corresponding device as well as to a related video-capture apparatus—e.g., a (video) camera—and a related computer-program product, loadable in the memory of at least one computer device and including software code portions for performing the steps of a method of an embodiment when the product is run on such a device. As used herein, reference to such a computer-program product is intended to be equivalent to reference to a computer-readable medium containing instructions for controlling an electronic device to coordinate the performance of such a method. Reference to "at least one computer" is intended to highlight the possibility for certain embodiments to be implemented in a distributed/modular fashion.

Various embodiments may provide a feature-based robust 2-D system, which achieves good performance with low power consumption.

Various embodiments may thus also be suitable for use, e.g., in cheap and small video cameras.

Various embodiments may include performing motion-model estimation based on matched features having passed a zone-of-interest test, which is confirmative (i.e., yields a positive outcome which indicates) that the matched features passing the test are distributed over a plurality of zones across frames.

BRIEF DESCRIPTION OF THE DRAWINGS

Various embodiments will now be described, by way of example only, by referring to the annexed figures, wherein.

DETAILED DESCRIPTION

Illustrated in the following description are various specific details aimed at an in-depth understanding of various exemplary embodiments. The embodiments may be obtained without one or more specific details, or through other methods, components, materials etc. In other cases, known structures, materials or operations are not shown or described in detail to avoid obscuring the various aspects of the embodiments. Reference to "an embodiment" in this description indicates that a particular configuration, structure or characteristic described regarding the embodiment is included in at least one embodiment. Hence, expressions such as "in an embodiment", possibly present in various parts of this description do not necessarily refer to the same embodiment. Furthermore, particular configurations, structures or characteristics may be combined in any suitable manner in one or more embodiments.

References herein are used for facilitating the reader and thus they do not define the scope of protection or the range of the embodiments.

Figure 1:
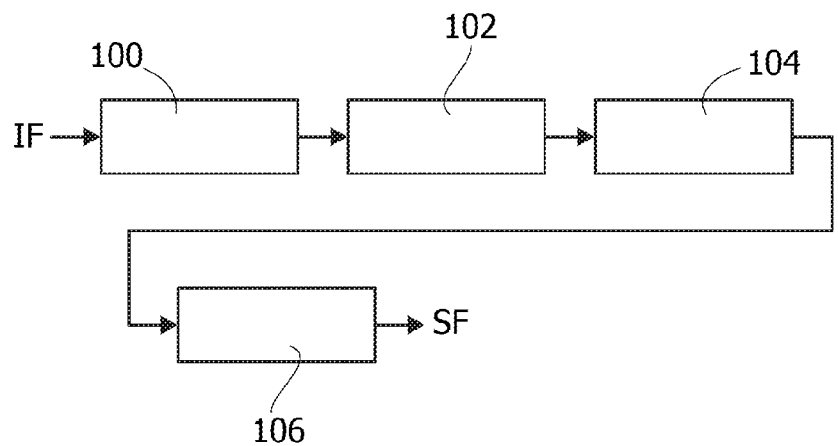
FIG. 1 is a block diagram representative of a feature-based digital video-stabilization scheme, according to an embodiment.

As shown in FIG. 1, various solutions of video stabilization procedures using features may operate on an input video sequence (input frames IF) by performing various processing steps such as, e.g.:
  feature extraction 100 of the input frames;
  feature matching 102;
  outlier removal 104; and
  motion-model estimation 106, using the inliers found, to generate a stabilized output video sequence, i.e., a sequence of stabilized frames SF.

Details of such an embodiment, which is adapted to provide good results also in critical conditions, are described in the literature, e.g., in [12].

As regards feature extraction and feature matching, the standard document ISO/IEC JTC1/SC29/WG11/W12929, includes, inter alia, a chapter entitled 5. Software Architecture and implementation details, which discloses an exemplary architecture for selecting features for compression in each video frame in a flow, and which is incorporated by reference.

Outlier removal is a well-known technique of statistics. An "outlier" is an observation that is distant from the rest of a set of statistical data collected, that is an outlying observation, or outlier, is one that appears to deviate markedly from the rest of a statistical sample, e.g., due to measurement errors or to the statistical population being sampled having a heavy-tailed distribution.

Motion-model estimation is a well-known approach which may be adopted, e.g., in motion-estimation techniques as used in encoding video signals according to MPEG standards.

All these concepts and possible practical implementations of these concepts are known in the art, which makes it unnecessary to provide a further detailed description herein.

For the sake of description herein, it will suffice to recall that an exemplary solution as exemplified in FIG. 1 may involve the following:

- two frames may be taken into consideration, i.e., a "previous" frame and a "current" frame;
- feature extraction 100 is performed on the previous frame and the current frame;
- feature matching 102 is performed between the features extracted for the previous frame and the current frame, respectively, and a set of matched features is obtained;
- outlier removal 104 is performed on the set of matched features, by splitting that set into two sub-sets, namely i) an inlier set, which includes those features that satisfy certain outlier-removal conditions, and ii) an outlier set, which is discarded;
- motion-model estimation 106 is then performed using the set of inliers thus found, and obtaining the parameters to stabilize the current frame;
- as a new frame is input to the system, the (former) current frame is taken as the (new) previous frame, and the incoming frame is taken as the (new) current frame;
- processing as described in the foregoing is restarted from feature extraction of the new current, incoming frame (feature extraction for the—now—previous frame has in fact been already performed previously, when that frame was the current one).

A four-step embodiment as depicted in FIG. 1 may be robust to noise, illumination changes, and motion blur.

Under certain conditions (e.g., moving objects in the scene and/or inliers concentrated in a part of the scene) such an embodiment may be exposed to critical operational issues primarily related to incorrect matching.

Figure 2:
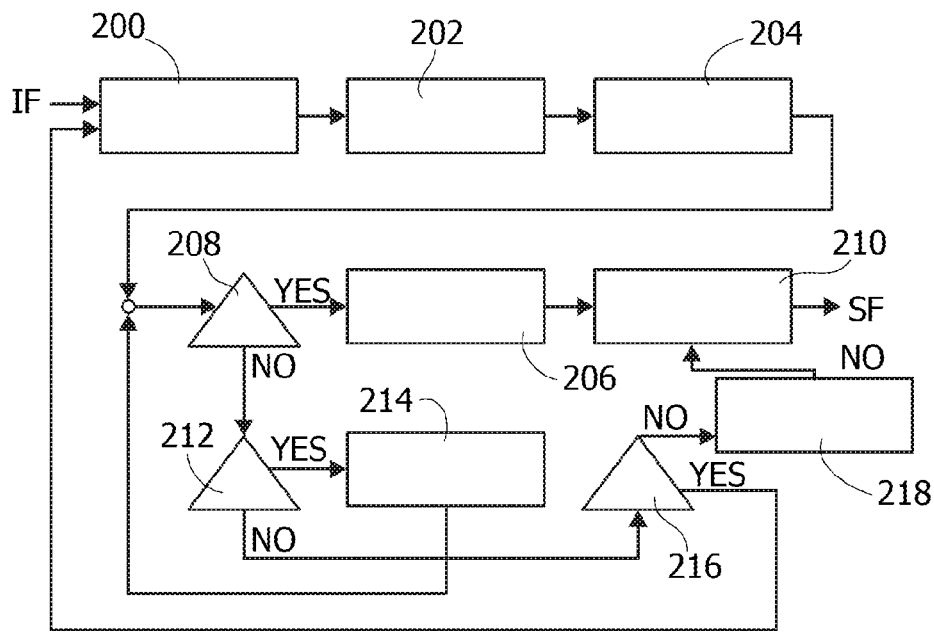
FIG. 2 is a block diagram representative of embodiments.

Various embodiments may provide improved operation in terms of quality and speed over the arrangement of FIG. 1 by adopting the approach represented in FIG. 2, involving a Zone-Of-Interest (ZOI) control.

In various embodiments, a panning filter may also be introduced to distinguish desired motion over unwanted motion.

An exemplary embodiment as exemplified in FIG. 22 may involve the following:

- again, two frames may be taken into consideration, i.e., a "previous" frame and a "current" frame;
- feature extraction 200 is performed on the previous frame and the current frame;
- feature matching 202 is performed between the features extracted for the previous frame and the current frame, respectively, and a set of matched features is obtained;
- outlier removal 204 is performed on the set of matched features, by splitting that set into two sub-sets, namely i) an inlier set, which includes those features that satisfy certain outlier-removal conditions, and ii) an outlier set, which is discarded Insofar as these steps are concerned, the procedure may be substantially as described in the foregoing in connection with FIG. 1, while, in various embodiments, feature extraction and matching within the framework of the block diagram of FIG. 2 may not involve distinctly calculating the features of the two frames considered and then performing the matching.

In various embodiments as exemplified in FIG. 2, the outcome of the outlier-removal step 204 may be subjected to a ZOI (Zone of Interest) control step 208.

This control is performed (as better detailed in the following) on the set of inliers in order to deal with the problems discussed in the foregoing in connection with the arrangement of FIG. 1.

If the ZOI control of step 208 is passed, motion-model estimation is then performed in a step 206 using the set of inliers found, thus obtaining—substantially as described previously with reference to FIG. 1—the parameters to stabilize the current frame.

In various embodiments, the motion vectors obtained by motion-model estimation in step 206 may be filtered in a step 210 with a panning filter (as better detailed in the following) and then the current frame stabilized is output as SF.

When a new frame is input to the system, the (former) current frame is taken as the (new) previous frame and the incoming frame is taken as the (new) current frame.

At this point, further processing starts from feature extraction (step 200) for the new frame by—again—taking into account that feature extraction for the now previous frame has in fact been already performed previously, when that frame was the current frame.

In various embodiments (as better detailed in the following) feature extraction and matching may involve calculating the features of the first frame and matching these features with the second frame.

In various embodiments, not all the extracted features, but only the set of inliers, may be considered for the (now) previous frame.

This may be of interest insofar as this amounts to maintaining an implicit history of the process and may make the procedure more robust in the case of moving objects in the scene.

If the control step 208 is not passed, then the inlier set is considered to be unreliable, and a possible further removal step of outliers is thus considered. To that effect, processing continues in a step 212, where a check is made as to whether the outlier set available is large enough by taking onto account that, e.g., at least four features may be needed to apply motion-model estimation.

If, in step 212, that condition is found to be met, in a step 214 a (further) outlier removal is applied on the outlier set, and processing continues with the ZOI control of step 208. It will be appreciated that, while the first outlier removal (step 204) may be calculated on all the matching feature pairs, in various embodiments the second outlier removal action (step 214) may be calculated on outliers, that is on all the matching features pairs by eliminating the inliers which have not passed the ZOI control of step 208.

If the check of step 212 yields a negative outcome (i.e., the outlier set is not large enough), then a check is made in step 216 as to whether this point has been found for the first time.

If the step 216 indicates that is the case (i.e., this is the first time the process reaches this point, whereby a certain probability exists of obtaining a reliable inlier set), then the process is restarted from step 200 for the previous frame and the current frame, by considering for the previous frame all the extracted features (and not just the inlier set).

Otherwise, if the step 216 indicates that this is not the first time the process reaches this point (whereby no probability exists of obtaining a reliable inlier set, since the extracted features of both previous and current frames have already been considered), in a step 218 the estimation parameters are reset (that is, no stabilization is made), and the (former) current frame is taken as the (new) previous frame and the incoming frame is taken as the (new) current frame, and further processing starts from feature extraction (step 200) for the new (i.e., current) frame by taking into account that, as in the arrangement exemplified in FIG. 1, feature extraction for the (now) previous frame has in fact been already performed previously, when that frame was the current one.

Various embodiments as exemplified with reference to FIG. 2 may take advantage of either or both of the following:
- an implicit history of the extracted features is maintained as long as possible in order to be able to deal with the problem of incoming moving objects in the scene;
- ZOI control and outlier removal of outliers are functional in dealing with the same problem and also with the problem of inliers concentrated in a part of the scene.

In various embodiments, feature extraction and matching (steps 202 and 204 of FIG. 2) may be effected in a fast yet precise way by resorting, e.g., to a technique based on Kanade-Lucas-Tomasi (KLT) corner detection (in the first step) and feature tracker (in the second step) as discussed in [9], [10].

In various embodiments, KLT processing may not involve calculating the features of the two frames considered and perform the matching, but may merely involve calculating the features of the first frame and matching these features with the features of the second frame.

In that case, the implicit-history mechanism is activated not only to discard possible new objects coming into the scene, but also to avoid feature extraction on a current frame.

In various embodiments, outlier removal may be based on the technique known as RANSAC [11].

As indicated, in certain embodiments, while the first outlier removal (step 204) may be calculated on all the matching feature pairs, the second outlier removal action (step 214) may be calculated on outliers, that is on all the matching features pairs by eliminating the inliers which have not passed the ZOI control of step 208.

These inliers are discarded as there is a substantial likelihood that these are parts of a moving object or they are not well distributed in the scene.

Figure 3:
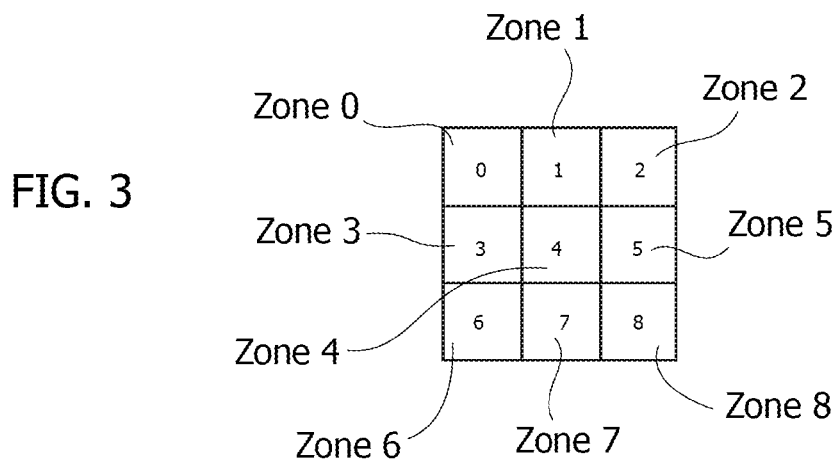
FIGS. 3 to 6 are exemplarily illustrative of certain processing possibly taking place in embodiments.

In various embodiments, the ZOI test of block 208 may involve dividing the frames being processed into a number of zones, e.g., nine zones, as exemplified in FIG. 3.

An underlying concept of various embodiments is to consider motion vectors (MV's) as correct only if features are not concentrated in a part of the image. Otherwise MVs are regarded as being unreliable, and parameter estimation is reset, that is MVs=0 (see, e.g., step 218).

In various embodiments, the ZOI test may be based on the following criteria (where $Z_n$=number of points in a zone n, which may be compared with a generic threshold TH):

ZOI_passed=
(($Z_0$>TH) AND ($Z_8$>TH)) OR (($Z_2$>TH) AND ($Z_6$>TH))
OR (($Z_1$>TH) AND ($Z_7$>TH)) OR (($Z_3$>TH) AND ($Z_5$>TH))
OR (($Z_0$>TH) AND ($Z_5$>TH)) OR (($Z_0$>TH) AND ($Z_7$>TH))
OR (($Z_2$>TH) AND ($Z_3$>TH)) OR (($Z_2$>TH) AND ($Z_7$>TH))
OR (($Z_6$>TH) AND ($Z_1$>TH)) OR (($Z_6$>TH) AND ($Z_5$>TH))
OR (($Z_8$>TH) AND ($Z_1$>TH)) OR (($Z_8$>TH) AND ($Z_3$>TH)).

In various embodiments, the threhsold TH may be set to zero, i.e., TH=0.

Figure 4:
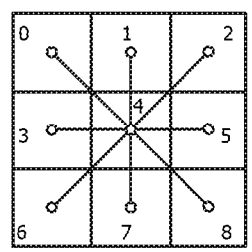
Figure 5:
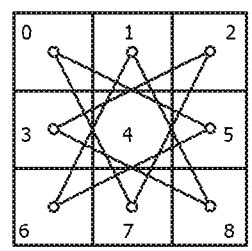
Figure 6:
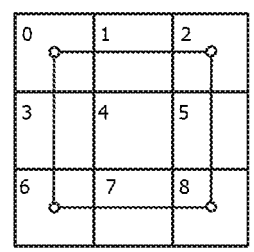

These criteria may be represented graphically, by noting that such a ZOI test is passed if at least one of the connected zones in FIGS. 4 to 6 is not empty.

This representation may take the form of two 8-points stars.

These are oftentimes referred to as "stars of regeneration" such a designation being based on the fact that circumcision in Jewish culture is traditionally performed on the 8th day of life, with baptism being in the New Testament the equivalent of circumcision (incidentally this is because the bases of Christian baptismal fonts oftentimes have eight sides).

Optionally, in various embodiments, other connected zones may be added in the control: these can be represented by the "frame" of the frame, as shown in FIG. 6.

In brief, in various embodiments, a purpose of the ZOI test of step 208 may be making sure that the "inliers" used for subsequent processing are distributed over various zones in the frame and not concentrated in a localized area of the frame, which may occur when one has to deal with a sequence having a homogeneous background (no details) with the inliers concentrated in one or more localized zones where the objects with more details are located, which is likely to correspond to an object moving over a localized area of an image being framed by an otherwise stable video sensor—i.e., not shaken or vibrated).

In various embodiments, as exemplified in the foregoing, the step 208 may be based on checking the presence of a certain number of points (for instance, when selecting, e.g., TH=0, a non-zero number of points, that is matched features—($Z_n$>0) over a plurality of zones mutually opposed across the frames.

As exemplified in FIGS. 4 to 6 (and assuming the frames considered are quadrilateral, i.e., square or rectangular, which is substantially non-limiting), in various embodiments, zones opposed across a frame may include one or more of the following, e.g.:
  i) located at diagonally opposed vertexes of the frame or on opposed (i.e., non-adjacent) sides of the frame, e.g.
  Zone 0 and Zone 8; Zone 2 and Zone 6
  Zone 1 and Zone 7; Zone 3 and Zone 5
  as exemplified in FIG. 4;
  ii) located on two adjacent sides of the frame and on the vertex where the two other sides of the frame join, e.g.:
  Zone 0 and Zone 5; Zone 0 and Zone 7;
  Zone 2 and Zone 3; Zone 2 and Zone 7;
  Zone 6 and Zone 1; Zone 6 and Zone 5;
  Zone 8 and Zone 1; Zone 8 and Zone3.
  as exemplified in FIG. 5;
  iii) located at the four vertexes of the frame, e.g.:
  Zone 0 and Zone 2; Zone 6 and Zone 8;
  Zone 0 and Zone 6; Zone 2 and Zone 8.
  as exemplified in FIG. 6.

Various embodiments may adopt combinations and/or variants of the foregoing (e.g., asymmetrical "star of regeneration" patterns).

Some examples may be useful in understanding the principles underlying the ZOI step.

A first example is an object in a scene moving from left to right within the scene, with very low details on the background.

In such a case, when the features in two subsequent frames are matched in the feature matching step 200 and filtered in the outlier removal step 204, practically all the features may be concentrated in a zone, e.g., zone 6, so that the registration will follow the moving object and it will fail.

In such an exemplary case, the ZOI test 208 will not be passed and the outlier removal step 214 will be applied on the outliers.

By considering new filtered features in the same subsequent frames (that is with these features well distributed in the scene), the ZOI test may then be passed, allowing video stabilization.

A second example may be similar to the previous one, save that the movement of the object in such a second example will be assumed to be up to down.

In such an exemplary case, the features may be assumed to be concentrated in Zone 7 and Zone 8 in two subsequent frames after the first outlier-removal step. The new filtered features will be well distributed in the same subsequent frames after the second outlier-removal step 214, by allowing again a perfect, or otherwise good, video stabilization.

As indicated previously, certain problems encountered with known solutions may be related not only to a moving object in the scene, but also to inliers concentrated in a part of the scene.

A third and a fourth example may be helpful in understanding the related circumstances in an "outdoor" sequence and an "indoor" sequence, respectively.

The features of two following frames after the first outlier-removal step 204 (which, by way of example, may be assumed to be concentrated in Zone 0) and after the second-outlier removal step 214 (now well distributed), respectively, will allow a correct video stabilization.

In various embodiments, a model may be adopted in 206, which model describes, e.g., inter-frame motion using four different parameters (rigid estimation), namely two shifts, one rotation angle and a zoom factor, and it associates a point $(x_i, y_i)$ in frame $I_n$ with a point $(x_f, y_f)$ in frame $I_n+1$ with the following transformation:

$$\begin{bmatrix} x_f = x_i \lambda \cos\theta - y_i \lambda \sin\theta + T_x \\ y_f = x_i \lambda \sin\theta + y_i \lambda \cos\theta + T_y \end{bmatrix}$$

where $\lambda$ is the zoom parameter, $\theta$ the rotation angle, $T_1$ and $T_y$ respectively X-axis and Y-axis shifts.

Considering N motion vectors we obtain the following over-constrained linear system:

$$A \cdot p = b$$

$$A = \begin{pmatrix} x_{i1} & -y_{i1} & 1 & 0 \\ \vdots & \vdots & \vdots & \vdots \\ x_{in} & -y_{in} & 1 & 0 \\ y_{i1} & x_{i1} & 0 & 1 \\ \vdots & \vdots & \vdots & \vdots \\ y_{in} & x_{in} & 0 & 1 \end{pmatrix}$$

$$p = \begin{pmatrix} a \\ b \\ c \\ d \end{pmatrix}$$

$$b = \begin{pmatrix} x_{f1} \\ \vdots \\ x_{fn} \\ y_{f1} \\ \vdots \\ y_{fn} \end{pmatrix}$$

where $a = \lambda\cos\theta$, $b = \lambda\sin\theta$, $c = T_x$, $d = T_y$.

Vector computation may be affected by noise so, in various embodiments, it may be useful to apply an Ordinary Least Squares method on a set of redundant equations to obtain the parameter vector.

$$p = (A^t \cdot A)^{-1} \cdot A^t \cdot b$$

All the similarity model parameters $\lambda$, $\theta$, $T_x$, $T_y$ may be easily derived from p vector components in the following way:

$$\lambda = \sqrt{a^2 b^2}$$

$$\theta = \tan^{-1}(b/a)$$

$$T_x = c$$

$$T_y = d$$

An ordinary Least Squares method performs well when outliers have been eliminated from the total set of features, as in this case, thanks to outlier removal (e.g., application of a previous RANSAC step), with the further pruning ZOI step.

Finally, the aim of the panning filtering 210 may be distinguishing between wanted and unwanted motion.

In various embodiments, such a filter may permit "panning" a smaller video window across a larger video frame, producing an output video having the dimensions of the panning window.

In various embodiments, the horizontal and vertical motions may be combined to allow an arbitrary panning direction.

In various embodiments, an IIR (Infinite Impulse Response) high-pass filter of order two, with cut-off frequency of, e.g., 0.4, may be selected as a panning filter 210. This may also have a lower group delay and may require lower taps than a FIR (Finite Impulse Response) filter, even though various embodiments may use a different type of panning filter.

Various embodiments may thus provide a low-cost procedure for video stabilization, adapted to be used easily in real-time processing, with one or more of the following advantages:

various embodiments may be robust to motion blur, noise, illumination changes (feature-based);

various embodiments may not be distracted by moving objects in the scene, even in conditions of low details in the background (ZOI feature);

various embodiments may be robust to scene changes (ZOI feature helps);

various embodiments may exhibit a good ability to follow user-intended motion (e.g., with a panning filter), with the ZOI feature and/or the panning filter adapted to contribute to improved performance and results.

Those of skill in the art will otherwise appreciate that the embodiments of, e.g., feature extraction and matching module(s)/function(s), outliners removal, motion-model estimation and panning filter as presented here are of purely exemplary nature, and that these functions/modules lend themselves to be performed by circuits and components other than those exemplified herein.

Also, some or all of the above steps may be performed in hardware, software, firmware, or a combination or subcombination of hardware, software, and firmware. For example, some or all of the above steps may be performed by a computing circuit, such as a microprocessor or microcontroller, that executes program instructions, or may be performed by a hardwired or firmware-configured circuit such as an ASIC or an FPGA.

Without prejudice to the underlying principles of the disclosure, the details and embodiments may vary, even appreciably, with respect to what has been described herein by way of non-limiting example only, without departing from the extent of protection of the disclosure.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

REFERENCES

[1] F. Vella, A. Castorina, M. Mancuso, G. Messina, "Digital Image Stabilization By Adaptive Block Motion Vectors Filtering", IEEE Transactions On Consumer Electronics, vol. 48, no. 3, August 2002;

[2] A. Engelsberg, G. Schmidt, "A comparative review of digital image stabilising algorithms for mobile video communications", IEEE Transactions on Consumer Electronics, Vol. 45, No. 3, August 1999;

[3] Paik, Park, Kim, "An adaptive motion decision system for digital image stabilizer based on edge pattern matching", IEEE ICCE Consumer Electronics, Digest of Technical Papers, June 1992;

[4] M. Kim, E. Kim, D. Shim, S. Jang, G. Kim, and W. Kim, "An Efficient Global Motion Characterization Method for Image Processing Applications", IEEE Trans. On Consumer Electronics, pp. 1010-1018, November 1997;

[5] D. G. Lowe, "Distinctive image features from scale-invariant keypoints", International Journal of Computer Vision, 60, 2 (2004), pp. 91-110.

[6] K. Mikolajczyk and C. Schmid, "A performance evaluation of local descriptor", IEEE Trans. on PAMI, Vol. 27, pp. 1615-1630, 2005.

[7] H. Bay, A. Ess, T. Tuytelaars, L. Van Gool, "SURF: Speeded Up Robust Features", Computer Vision and Image Understanding, Vol. 110, No. 3, pp. 346-59, 2008.

[8] B. Pinto, P. R. Anurenjan, "Video stabilization using Speeded Up Robust Features", International Conference on Communications and Signal Processing, pp. 527-531, 2011.

[9] B. Lucas, T. Kanade, "An Iterative Image Registration Technique with an Application to Stereo Vision", Proceedings of Imaging Understanding Workshop, pp. 121-130, 1981.

[10] J. Shi, C. Tomasi, "Good Features to Track", IEEE Conference on Computer Vision and Pattern Recognition, June 1994.

[11] M. A. Fischler, R. C. Bolles, "Random sample consensus: a paradigm for model fitting with applications to image analysis and automated cartography," Communications of the ACM, vol. 24, no. 6, pp. 381-395, 1981.

[12] Teng Fei, Liang Xiao-hui, He Zhi-ying, Hua Guo-liang, "A Registration Method Based on Nature Feature with KLT Tracking Algorithm for Wearable Computers", International Conference on Cyberworlds, pp. 416-421, 2008.

The above-listed references are incorporated by reference.

The invention claimed is:

1. An apparatus, comprising:
a comparator configured to identify
    features of a first image, and
    features of a second image that match the features of the first image, wherein the features of the second image that match the features of the first image define a set of matched features;
a stabilizer configured to generate stabilized frames through motion model estimation based on inlier features having passed a zone-of-interest test that confirms that the inlier features are distributed over a plurality of zones across the first and second images; and
an outlier remover configured:
    to identify as an outlier feature any outlying feature of the first and second images identified by the comparator;
    to identify as an inlier feature any other feature of the first and second images identified by the comparator; and
    to provide the inlier features to the stabilizer.

2. The apparatus of claim 1, further comprising a filter configured to filter the features of the first and second images identified by the comparator, and to provide the filtered features to the stabilizer.

3. An apparatus, comprising:
a comparator configured to identify
    features of a first image, and
    features of a second image that match the features of the first image;
a stabilizer configured to stabilize a motion of one of the first and second images
    if a distribution of the features of the first image meets a first criterion, and
    if a distribution of the features of the second image meets a second criterion;
a first outlier remover configured,
    to identify as a first outlier feature any outlying feature of the first and second images identified by the comparator,
    to identify as an inlier feature any other feature of the first and second images identified by the comparator;
a distribution detector configured
    to determine if the distribution of the inlier features of the first image meets the first criterion,
    to determine if the distribution of the inlier features of the second image meets the second criterion,
    to provide the inlier features of the first and second images to the stabilizer if the distribution of the features of the first image meets the first criterion and the distribution of the features of the second image meets the second criterion,
    to provide the first outlier features to a second outlier remover if a number of the first outlier features is greater than a threshold, and the distribution of the features of the first image does not meet the first criterion or the distribution of the features of the second image does not meet the second criterion, and
    to bypass the stabilizer if the number of first outlier features is less than the threshold, and the distribution of the features of the first image does not meet the first criterion or the distribution of the features of the second image does not meet the second criterion; and
the second outlier remover is configured
    to identify as a second outlier feature any outlying first outlier feature of the first and second images, and to provide to the distribution detector as a respective inlier feature each of the second outlier features.

4. A method of stabilizing a sequence of input video frames, comprising:
performing feature extraction on a pair of input video frames in the sequence to produce extracted features for the pair of input video frames;
performing feature matching on the extracted features to produce a set of matched features;
performing outlier removal on the set of matched features to produce an inlier set of matched features; and
generating stabilized frames through motion model estimation based on the inlier set of matched features, the motion model estimation being based on the inlier set of matched features having passed a zone-of-interest test that confirms that the inlier set of matched features that pass the zone-of-interest test are distributed over a plurality of zones across the pair of input video frames.

5. The method of claim 4, wherein the zone-of-interest test confirms that the inlier set of matched features passing the test are distributed over a plurality of zones opposed across the pair of input video frames.

6. The method of claim 5, wherein the zone-of-interest test confirms that the inlier set of matched features passing the test are distributed over a plurality of zones including at least one of:
zones located at diagonally opposed vertexes or on opposed sides of the frame;
zones located on two adjacent sides of the frame and on the vertex where the two other sides of the frame join; and
zones located at the four vertexes of the frame.

7. The method of claim 6, wherein the matched features failing to pass the zone-of-interest test are re-submitted to the zone-of-interest test after further outlier removal processing by eliminating the inliers which have not passed the zone-of-interest test.

8. The method of claim 7, including:
making the further outlier removal processing conditional on a check on the number of outliers available, the check being a function of the number of features needed for the motion model estimation, and
omitting the motion model estimation in case the check fails indicative of an insufficient number of features being available for motion model estimation.

9. The method of claim 8, including:
when the check indicative of an insufficient number of features being available for motion model estimation fails for the first time, re-inputting the pair of frames to the feature extraction and matching, and
finally omitting the motion model estimation when the check indicative of an insufficient number of features being available for motion model estimation repeatedly fails.

10. The method of claim 9, wherein the feature extraction and feature matching include calculating the features on a first frame in the pair and matching these features with the second frame in the pair.

11. The method of claim 10, wherein the pair includes a current frame and a previous frame already subjected to outlier removal, and wherein the feature matching involves for the previous frame only the set of inliers resulting from the outlier removal.

12. The method of claim 4, wherein performing feature extraction and performing feature matching comprises at least one of performing feature extraction and matching through Kanade-Lucas-Tomasi corner detection and feature tracker, and performing performing outlier removal includes RANSAC outlier removal.

13. The method of claim 4, wherein generating stabilized frames through motion model estimation adopts a model describing inter-frame motion using two shifts, one rotation angle and a zoom factor.

14. The method of 4, wherein generating stabilized frames through motion model estimation involves noise filtering by obtaining the parameter vector of the model by Least Squares processing.

15. The method of claim 4 further comprising, after generating stabilized frames through motion model estimation, performing panning filtering through IIR high pass filtering.

* * * * *